G. E. LEONARD.
COMPUTING DEVICE.
APPLICATION FILED MAR. 21, 1912.
1,076,680.
Patented Oct. 28, 1913.
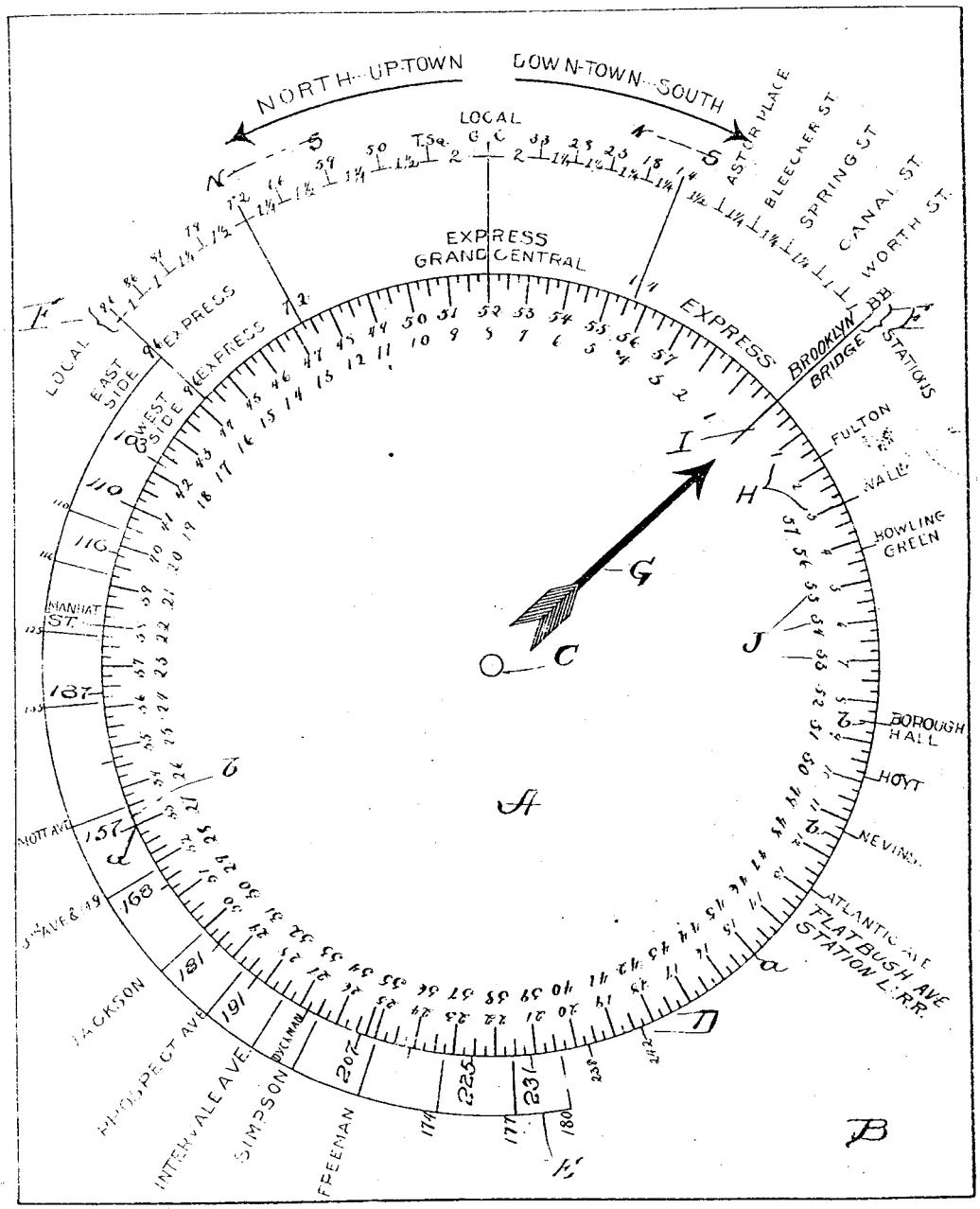

UNITED STATES PATENT OFFICE.

GEORGE EVERSON LEONARD, OF GARDEN CITY, NEW YORK.

COMPUTING DEVICE.

1,076,680.  Specification of Letters Patent.  Patented Oct. 28, 1913.

Application filed March 21, 1912. Serial No. 685,389.

*To all whom it may concern:*

Be it known that I, GEORGE EVERSON LEONARD, a citizen of the United States, residing at Garden City, in the county of Nassau and State of New York, have invented certain new and useful Improvements in Computing Devices, of which the following is a specification.

This invention relates to computing devices, and, with regard to certain more specific features thereof, to calculators involving predetermined relations between two unlike quantities, such as distances and intervals of time.

The invention has for an object the provision of a simple and quickly operated device for ascertaining the intervals of time corresponding to given data relating to distances.

Another object is the provision of an easily comprehended, accurate and handy calculator for problems involving the times of transit on railways or other means of transportation.

Another object is the provision of means adapted to indicate readily and without appreciable mental effort on the part of the user answers to a large variety of problems involving the times of transit over given parts of one or more lines of a railway system on one or more classes of trains.

Other objects will be in part obvious and in part pointed out hereinafter.

The invention accordingly consists in the features of construction, combinations of elements and arrangement of parts which will be exemplified in the construction hereinafter set forth, and the scope of the application of which will be indicated in the following claims.

In the drawing, in which is illustrated one of various possible embodiments of my invention, the figure shown represents a top plan or diagram view of the device.

Referring in detail to the drawing, as illustrating the preferred embodiment of my invention,—A, designates a movable member such as a rotatable disk, which is shown as preferably comprising a circular piece of sheet material that is superimposed or mounted on the underlying support or base B, to lie flat in substantially the same horizontal plane therewith, and which is adapted to be moved or turned by the hand of the operator into different positions, by reason of the pivoted connection at its center, as shown at C. In this construction the rotatable disk A, is shown as arranged concentrically within a space formed by sets of annularly disposed indicia or tabular devices, D. E. and F., which are marked or printed on the upper face of the base B. These annular sets of indicia or tabular devices are provided to represent graphically one or more of the various lines or routes of a railway system (such, for example, as the New York city subway) arranged in a systematic order, while each set of indicia or tabular devices comprises lines and spaces that are marked to indicate the relative location of the stations or streets on the respective lines forming the system, the spaces between adjacent indicia relating to time intervals, as will be hereinafter more fully explained. The rotatable disk is provided on its peripheral portion or edge with lines and spaces arranged to form an annular set of indicia, to designate time intervals, while the radially disposed lines thereof are extended so as to be adapted to be brought into coincidence or register with the adjacent radially extended lines or markings of any one of the sets of indicia or tabular devices printed on the base, to thereby provide a reading that will indicate in connection with the relative location and distance between any given stations, the time of travel required therebetween. The rotatable or timing disk scale is shown as comprising primary intervals (*a*) and subintervals (*b*) to designate intervals of time in minutes and fractions thereof, while the radially disposed lines of said scale are extended to the edge of the disk to present thereby an indicating edge. The annular set of indicia thus formed is provided preferably with two sets or series of numerals or totalizing figures that are arranged in concentrically disposed lines or columns, which extend progressively from the zero mark I. in reverse directions and which serve in connection with said division lines to form a table or direct scale reading for the measuring of time from the zero mark I.

G. designates an index arrow or pointer that is arranged in radial alinement with the zero mark I., and which serves to assist in the ready reference thereto.

The outer set or series of numerals H. set against the annular scale of the rotatable disk serves for the computation of time, when employed, by reading clockwise as in computing the time of travel going in the direction corresponding to clockwise on the scale D, that is to say, south, while the inner set or series J, serve to designate the measure of time of travel by reading the totalizing figures counter-clockwise in computing the time of travel going in the opposite direction, say north.

Referring now more particularly to the schematic arrangement of the respective lines or routes of the subway as indicated by the line scales or tabular devices on the base B, it will be noted that the main (express) line is represented as extending by curve line scale in concentric coincidence with the edge of the timing disk from the point marked Atlantic ave., on the right hand side of the disk, to the point marked 242, on the left hand side of the disk. Furthermore it will be noted that the diverging line, designated as the east side, which starts from the junction station designated as 96, on the main line, extends a definite length to the station marked 180, as denoted by the outer curve line scale that extends concentrically with respect to the inner curve or that portion thereof that extends from 96 to a point between 231 and 238.

The lines and routes thus far described are employed in the subway, primarily, as express lines and the stations thereon are appropriately designated.

Extending from right to left at a point above the timing disk A, is a supplemental annular local-line scale F, of definite length, which comprises radially disposed lines to indicate station location. This scale extends in concentric and spaced relation with respect to that portion of the express line traversed by local trains as well. The local line scale in addition bears station lines that extend in radial coincidence to points or stations on the express line, where changes can be made for travel from express trains to locals and vice versa. In addition to the indicia relating to distances the local line scale bears thereon indicia relating to time intervals, as indicated by the lower line of numerals, the use or application of which will be presently pointed out.

*Legends.*—Associated with the line scales or tabular devices on the base B, are to be found appropriate index or guiding words or legends. The express line scales are each denoted by the words "Express" as shown in the drawing, while the west side and east side lines are properly indicated by such designations. The supplemental line scale is likewise provided with the word "Local" centrally arranged. immediately above said scale. The supplemental scale is further provided with the word "Local" immediately to the right of said scale, and with the word "Stations" immediately to the left thereof. The entire layout of scales and tabular devices is provided at a point above the scales and centrally arranged with oppositely directed curved line arrows, bearing indicia suitable for showing at a glance the direction of travel.

The operation of the above described embodiment of the invention will be clear from a statement of general rules to be observed, followed by two or three specific examples of the application of said rules.

To find the time of transit between any two stations: I. Place arrow at express station at the beginning of journey. II. Going down town or south (toward Brooklyn), read outer series of figures on disk opposite express station at end of journey. III. Going up town or north (from Brooklyn), read inner set or series of figures on disk opposite express station at end of journey. IV. If coming from or going to a local station add the minutes marked on local station curve.

This device has its calculations based on the average time found by actual experience on many journeys to have been consumed between the different stations.

Briefly, the device is employed in the following manner, to wit: If the station selected from which to calculate the time of travel is that indicated in the drawing by the radially extended line designated as BB, (Brooklyn Bridge) the rotatable disk is turned until its zero mark L, *i. e.* the one designated by the index arrow or pointer G, registers therewith, whereupon if it is desired to find or compute the time of travel from that point going up town to the Grand Central or G. C. Station, all that is necessary to do is to read the totalizing figure of the inner annular series on the disk at the point opposite or coincident with that marking the station designated as G. C. This we find to be 8. Therefore the average time of travel on the express line from Brooklyn Bridge or BB to Grand Central Station or G. C. will be eight minutes. If it is desired to continue the journey by a transfer from the express line to the local line, the time of travel required to continue to the 50th Street Station can readily be estimated by reading the supplemental scale marked "Local," where we find it indicated that two (2) minutes are required to travel on the local to Times Square (T. Sq.), and 1½ minutes more or a total of 3½ minutes to 50th street, from Grand Central Station, which sum is to be added to the 8 minutes obtained as the time of travel from Brooklyn Bridge to Grand Central, giving 11½ minutes as the time of transit between Brooklyn Bridge and 50th street. By this simple process of addition for local trains the mind of the operator or investigator is not taxed, while the scope and value of the device is correspondingly increased. To give another example of the employment of this device let it again be assumed that the disk has been adjusted so that the zero-mark I, registers as shown in the drawing, with the BB station designation, and that it is desired to compute the time of travel therefrom to Borough Hall, Brooklyn,—in this case we find with the disk thus adjusted that the mark of the disk registering with the Borough Hall mark to be a ½ minute subdivision line, which in reading must be added to the adjacent totalizing figure, of the proper series, which we find to be 8, of the outer annular series. Therefore we find that the average time it will take to travel from BB Station to Borough Hall Station is 8½ minutes. To give further example of the use of this device supposing it is desired to estimate the time of travel from the same starting point as indicated by the arrow G, namely Brooklyn Bridge Station and that the destination is Jackson Station in the east side express line,—we find by consulting the totalizing figures of the inner series, i. e. the figure set against that point with the disk adjusted as shown, to be 30,—in other words, it will take 30 minutes to make the trip from Brooklyn Bridge Station to Jackson Station.

The above examples are merely indicative of the use of the device and no attempt is here made to exemplify the full capacity of the device and as many changes could be made in the above construction and many apparently widely different embodiments of this invention could be made without departing from the scope thereof, it is intended that all matter contained in the above description or shown in the accompanying drawing shall be interpreted as illustrative and not in a limiting sense. It is also to be understood that the language used in the following claims is intended to cover all of the generic and specific features of the invention herein described and all statements of the scope of the invention, which, as a matter of language, might be said to fall therebetween.

Having described my invention, what I desire to claim as new and useful is:

1. In a computing device, in combination, two juxtaposed relatively movable scales, the first graduated in units of time and the second designating localities, the spaces between adjacent indicia of the second scale being proportional to time intervals; a third scale fixed relatively to the second and having indicia in common with indicia of the second scale, the spaces between adjacent indicia of the third scale being marked to designate other time intervals, whereby time intervals between localities designated on different scales may be found by adding a time interval indicated on the first scale to certain of the time intervals marked on the third scale.

2. In a computing device, in combination, two relatively fixed scales, both indicating localities, certain of the localities being common to both scales, the spaces between adjacent indicia on the first scale being proportional to time intervals, the spaces between adjacent indicia on the second scale being marked to indicate other time intervals, a third scale graduated in units of time, said third scale being juxtaposed and movable relatively to said first scale, whereby the time intervals between localities indicated on different scales may be calculated by adding intervals marked on the second scale to an interval indicated on the third scale.

3. In a computing device, in combination, a support, a scale thereon with indicia designating localities, the spaces between adjacent indicia being proportional to time intervals, a second scale in juxtaposition to the first scale, and provided with indicia designating localities, some of the localities being common to the two scales, the spaces between adjacent indicia on the second scale being marked to indicate other time intervals, and a second support adapted to be adjustably positioned with respect to said first support, and having indicia designating time intervals, whereby the time intervals between localities indicated on different scales may be calculated by adding a time interval indicated on the second support to certain of the time intervals marked on the second scale.

4. In a computing device, in combination, a support, a scale thereon with indicia designating localities, the spaces between adjacent indicia being proportional to time intervals, a second scale in juxtaposition to the first scale, and provided with indicia designating localities, some of the localities being common to the two scales, the spaces between adjacent indicia on the second scale being marked to indicate other time intervals, and a second support adapted to be adjustably positioned with respect to said first support, and having two sets of indicia extending in opposite directions, and both designating time intervals, whereby the time intervals between localities indicated on different scales may be calculated by adding a time interval indicated on said second support to certain of the time intervals marked on the second scale.

5. In a computing device, in combination, a support, an annular scale thereon with indicia designating localities, the spaces between adjacent indicia being proportional to time intervals, a second annular scale in juxtaposition to the first scale, and provided with indicia designating localities, some of the localities being common to the two scales, the spaces between adjacent indicia on the second scale being marked to indicate other time intervals, and a disk adapted to be adjustably positioned with respect to said first support, and having adjacent its rim indicia designating time intervals, whereby the time intervals between localities indicated on different scales may be calculated by adding a time interval indicated on the disk to certain of the time intervals marked on the second scale.

6. In a computing device, in combination, a support, an annular scale thereon with indicia designating localities, the spaces between adjacent indicia being proportional to time intervals, a second annular scale in juxtaposition to the first scale, and provided with indicia designating localities, some of the localities being common to the two scales, the spaces between adjacent indicia on the second scale being marked to indicate other time intervals, and a disk adapted to be adjustably positioned with respect to said first support, and having adjacent its rim two sets of indicia extending in opposite directions, and both designating time intervals, whereby the time intervals between localities indicated on different scales may be calculated by adding a time interval indicated on said disk to certain of the time intervals marked on the second scale.

In testimony whereof I affix my signature in presence of two witnesses.

GEORGE EVERSON LEONARD.

Witnesses:
    HOWARD J. MANDELL,
    WALKER B. WALDER.